United States Patent
Saga

(10) Patent No.: US 9,298,500 B2
(45) Date of Patent: Mar. 29, 2016

(54) INFORMATION PROCESSING SYSTEM AND CONTROL METHOD OF INFORMATION PROCESSING SYSTEM FOR MANAGING JOBS IN A DISTRIBUTED MULTI-NODE ENVIRONMENT

(71) Applicant: FUJITSU LIMITED, Kawasaki-shi, Kanagawa (JP)

(72) Inventor: Kazushige Saga, Taito (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/457,172

(22) Filed: Aug. 12, 2014

(65) Prior Publication Data
US 2015/0095916 A1    Apr. 2, 2015

(30) Foreign Application Priority Data
Sep. 30, 2013 (JP) .................. 2013-205535

(51) Int. Cl.
*G06F 9/46* (2006.01)
*G06F 9/48* (2006.01)
*G06F 9/50* (2006.01)

(52) U.S. Cl.
CPC ............ *G06F 9/4843* (2013.01); *G06F 9/5066* (2013.01)

(58) Field of Classification Search
USPC ............................................ 718/1, 100–107
IPC .................... G06F 9/4843, 9/485, 9/50
See application file for complete search history.

(56) References Cited

U.S. PATENT DOCUMENTS

| | | | | |
|---|---|---|---|---|
| 6,434,590 B1 * | 8/2002 | Blelloch | ............... | G06F 9/5066 718/102 |
| 6,763,519 B1 * | 7/2004 | McColl | ................. | G06F 9/5044 709/202 |
| 7,712,100 B2 * | 5/2010 | Fellenstein | ............ | G06Q 40/04 705/37 |
| 8,020,161 B2 * | 9/2011 | Markov | ................ | G06F 9/4818 718/103 |

(Continued)

FOREIGN PATENT DOCUMENTS

| | | |
|---|---|---|
| JP | 2005-208922 A | 8/2005 |
| JP | 2011-243112 A | 12/2011 |
| JP | 2012-221037 A | 11/2012 |

OTHER PUBLICATIONS

Wang et al, "Next Generation Job Management Systems for Extreme-Scale Ensemble Computing", ACM, pp. 111-114, 2014.*

(Continued)

*Primary Examiner* — Anil Khatri
(74) *Attorney, Agent, or Firm* — Fujitsu Patent Center

(57) ABSTRACT

The job management at includes the following units. An information acquiring unit acquires information related to a job that is submitted in a predetermined time period. A weight calculating unit determines, on the basis of the information related to the job, the degree of influence for each shape of the job. A target shape determining unit determines, as pre-placement target shapes, shapes of a predetermined number of jobs in the order the degree of influence is high. A pre placement table computing unit determines, on the basis of the pre-placement target shapes and the degree of influence, pre placement of a job that is a way of placing a job to one of the computing nodes. A placement determining unit allocates, when a submitted job matches one of the pre-placement target shapes, the submitted job to the one of the computing nodes in accordance with the pre placement.

10 Claims, 10 Drawing Sheets

(56) References Cited

U.S. PATENT DOCUMENTS

| | | | | |
|---|---|---|---|---|
| 8,185,908 B2* | 5/2012 | Taniguchi | ............. | G06F 9/5038 709/221 |
| 8,205,208 B2* | 6/2012 | Mausolf | ................ | G06F 9/4881 709/201 |
| 8,332,862 B2* | 12/2012 | Isard | ....................... | G06F 8/433 709/201 |
| 8,418,186 B2* | 4/2013 | Jackson | .................... | G06F 9/50 709/223 |
| 8,434,084 B2* | 4/2013 | Ferdous | ................ | G06F 9/5044 709/203 |
| 8,516,494 B2* | 8/2013 | Barsness | ............... | G06F 9/5038 718/100 |
| 8,640,137 B1* | 1/2014 | Bostic | ................... | G06F 9/5072 718/101 |
| 8,671,409 B2* | 3/2014 | Spata | ..................... | G06F 9/4881 718/102 |
| 8,689,220 B2* | 4/2014 | Prabhakar | ............. | G06F 9/4893 703/13 |
| 8,700,929 B1* | 4/2014 | Weber | .................. | G06F 1/3206 713/300 |
| 8,776,076 B2* | 7/2014 | Chi | .................... | G06Q 30/0283 709/223 |
| 8,875,142 B2* | 10/2014 | Shivanna | .............. | G06F 9/4881 714/1 |
| 2011/0286328 A1 | 11/2011 | Sugauchi et al. | | |

OTHER PUBLICATIONS

Marshall et al, "Improving Utilization of Infrastructure Clouds", IEEE, pp. 205-214, 2011.*

Moreira et al, "Scheduling Multiple Independent Hard-Real-Time Jobs on a Heterogeneous Multiprocessor", ACm, pp. 57-66, 2007.*

Ravi et al, " Scheduling Concurrent Applications on a Cluster of CPU-GPU Nodes", IEEE, pp. 140-147, 2012.*

Tak et al, "Performance Study of Real-time Scheduling Schemes in Configurable Component-based Sensor Node Platforms", ACM, pp. 1-8, 2014.*

Kim et al, " Integrating Real-Time Hybrid Task Scheduling into a Senor Node Platform", ACM, pp. 737-741, 2010.*

Gotoda et al, "Task scheduling algorithm for multicore processor system for minimizing recovery time in case of single node fault", IEEE, pp. 260-267, 2012.*

* cited by examiner

| JOB SHAPE | | FREQUENCY OF APPEARANCE | SUBTOTAL OF EXECUTION TIME PERIOD | WEIGHT |
|---|---|---|---|---|
| LONG SIDE | SHORT SIDE | | | |
| 3 | 3 | 2120 | 12555 | aaa |
| 3 | 2 | 711 | 4831 | bbb |
| 5 | 5 | 1335 | 4087 | ccc |
| 5 | 1 | 2851 | 24386 | ddd |
| ⋮ | ⋮ | ⋮ | ⋮ | ⋮ |

| | JOB SHAPE | | WEIGHT IN DESCENDING ORDER |
|---|---|---|---|
| | LONG SIDE | SHORT SIDE | |
| 221 | 5 | 1 | ddd |
| 222 | 3 | 3 | aaa |
| 223 | 3 | 2 | bbb |
| 224 | 5 | 5 | ccc |
| | ⋮ | ⋮ | ⋮ |

| JOB SHAPE | | PLACEMENT COORDINATES | | LONG SIDE AXIS |
|---|---|---|---|---|
| LONG SIDE | SHORT SIDE | X COORDINATE | Y COORDINATE | |
| 5 | 1 | 0 | 3 | Y |
| 3 | 3 | 1 | 3 | Y |
| 3 | 2 | 2 | 3 | Y |
| 5 | 5 | 0 | 0 | X |
| 3 | 3 | 3 | 0 | X |
| 3 | 2 | 6 | 0 | Y |
| 5 | 5 | 3 | 3 | X |

INFORMATION PROCESSING SYSTEM AND CONTROL METHOD OF INFORMATION PROCESSING SYSTEM FOR MANAGING JOBS IN A DISTRIBUTED MULTI-NODE ENVIRONMENT

CROSS-REFERENCE TO RELATED APPLICATIONS

This application is based upon and claims the benefit of priority of the prior Japanese Patent Application No. 2013-205535, filed on Sep. 30, 2013, the entire contents of which are incorporated herein by reference.

FIELD

The embodiments discussed herein are related to an information processing system, a management device control program, and a control method of the information processing system.

BACKGROUND

In parallel computer systems that are information processing systems, in particular, in High Performance Computing (HPC) systems, systems that include over 100,000 nodes are developed to improve the performance. The nodes mentioned here are the unit of processing units that execute information processing and are, for example, central processing units (CPU), such as arithmetic processing units.

If the number of nodes becomes enormous, in an indirect network in which communication is performed via a typical crossbar switch as a communication between nodes, the amount of resources of switches becomes enormous, which is impractical. Accordingly, if the number of nodes becomes enormous, a direct network in which adjacent nodes are directly connected is often used as an interconnection. In a direct network, communication between nodes that are not adjacent each other is performed via an interconnect router that is implemented on intermediate nodes between both nodes that communicate with each other. A mesh type or a torus type is often used for a network topology of the direct network, i.e., the structure of a network.

In a parallel computer system that uses the direct network, if a node that executes a parallel job-B is present between nodes that execute a parallel job-A (hereinafter, "parallel job" is simply referred to as "job"), communication between the nodes that performs these jobs affect each other, resulting in the reduction of the performance of the communication. Specifically, this state eventually results in an increase in the time taken to execute both jobs. Accordingly, to improve the job execution performance, a parallel job is placed in an adjacent node group. Furthermore, a parallel application is designed such that, in calculation, the number of times of communication between adjacent nodes is greater than that performed to another node.

In the parallel computer system, that has mesh type or torus type interconnect (hereinafter, simply referred to as a "parallel computer system"), the communication efficiency is improved when the network topology matches the communication structure of the application, and, furthermore, the job execution performance is increased. For example, in a parallel computer system, to execute a parallel application that needs a large number of adjacent communications for a two-dimensional data array, the performance is improved when the parallel application is executed in a two-dimensionally arrayed node group compared with a case in which the parallel application is executed in a one-dimensionally arrayed node group. Consequently, in parallel computer system in general, when a user submits a job, the user specifies a shape of node group suitable for the job. In the parallel computer system, a job scheduler determines which job is executed by which node. This management work is called "job placement" The job scheduler does not simply determine the job placement in accordance with the number of nodes but performs job placement calculation by taking into consideration a job shape.

In a description below, the placement shape of nodes suitable for a job is referred to as a "job shape". Furthermore, job shapes with different sizes are treated as different job shapes. For example, even if job shapes are square, it is determined that the job shape of 3×3 nodes and the job shape of 5×5 nodes are different job shapes. Furthermore, if the communication performance in each dimensional direction is a network is the same, the same execution performance can be obtained even if the job shape is rotated. Consequently, job shapes with the same shape when the job shapes are rotated are treated as the same job shapes. For example, the job shape of 2×3 nodes and the job shape of 3×2 nodes are treated as the same job shape.

There is a conventional method used, as a job placement method, in a conventional parallel computer system that determines, when a certain job is placed, placement of the job by taking into consideration the subsequent jobs that are submitted in the future can be arranged as many as possible. For example, there is a job placement method that determines the placement such that the number of nodes in adjacent unused nodes after the job placement becomes the maximum. In this case, for example, if multiple candidates of placement in which the number of nodes in unused node groups is the maximum are present, the placement is determined such that, first, a priority is given to the number of adjacent unused nodes in the downward direction and then, a priority is given to the number of adjacent unused nodes in the right direction.

If a large number of jobs with various job shapes are submitted in a parallel computer system, there may be small sized unused node groups. This situation is called "fragmentation".

There is a conventional technology that calculates the utilization rate per program on the basis of the time occupied by a program, the execution frequency, and the utilization rate of a computing node and then allocates programs to multiple computers in the order the size of the programs is large.

Patent Document 1: Japanese Laid-open Patent Publication No. 2011-243112

If jobs are placed such that the number of unused nodes is simply increased, when a job is placed afterwards, even it the total number of the unused nodes meets the number of nodes requested by the job, there may be a case in which jobs are not able to be placed due to different job shapes. In such a case, the job that is not able to be placed becomes in a waiting state and thus the remaining nodes that are not able to be job placed are unused.

In an actual system, when jobs are queued in job queue, even if the top of waiting job in the job queue is not executed due to the situation described above, a subsequent job in the execution queue may possibly be executed. Determining whether to execute the job by using this method, which is usually referred to as "backfill", depends on a system management policy and varies for each parallel computer system. Furthermore, even if the policy permits execution of the subsequent job in advance, small size fragmentation may be further occur because the structure of an unused node does not match the job shape of the job that can be executed. Consequently, it is inevitable that an unused node is generated. In this way, the utilization of the nodes is decreased due to fragmentation.

SUMMARY

According to an aspect of an embodiment, an information processing system includes: a plurality of information processing apparatuses; and a management device that manages allocation of a job that is processed by one of the information processing apparatuses to the one of the information processing apparatuses, wherein the management device include an information acquiring unit that acquires information related to each of a plurality of jobs that are submitted in a predetermined time period, a calculating unit that calculates, on the basis of the information related to each of the jobs, the degree of influence due to a frequency of appearance or an occupied time period for each of shapes of the jobs, a shape determining unit that determines, as pre placement target shapes, shapes of a predetermined number of jobs in the order the degree of influence is high, a pre placement table computing unit that determines, on the basis of the pre placement target shapes and the degree of influence, pre placement of the jobs that is a way of allocating the jobs to one of the information processing apparatuses, and a job placement unit that places, when a submitted job matches one of the pre placement target shapes, the submitted job to the one of the information processing apparatuses in accordance with the pre placement.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a schematic diagram illustrating an example of a job information table;

FIG. 4 is a schematic diagram illustrating an example of a job shape ranking table;

DESCRIPTION OF EMBODIMENTS

Preferred embodiments of the present invention will be explained with reference to accompanying drawings.

The in processing system, the management device control program, and the control method of the information processing system is not limited to the embodiments described below.

[a] First Embodiment

Figure 1:
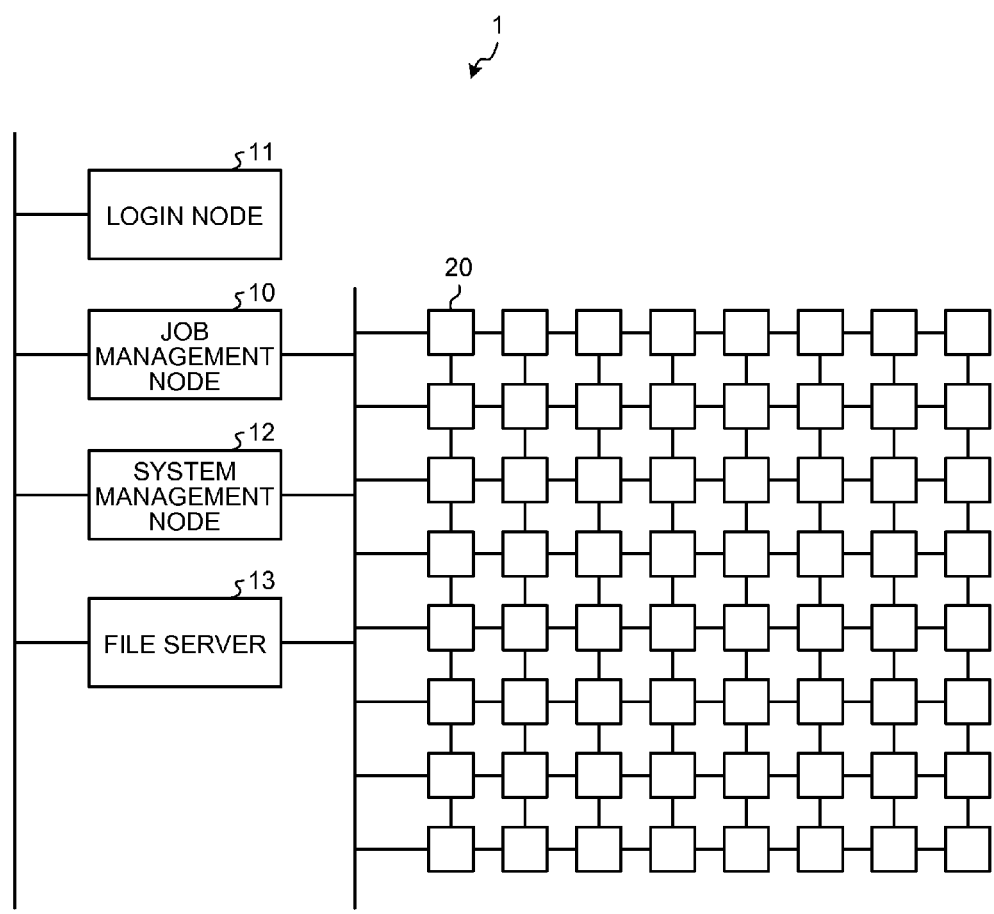
FIG. 1 is a schematic diagram illustrating the overall configuration of an information processing system.

FIG. 1 is a schematic diagram illustrating the overall configuration of an information processing system. An information processing system 1 according to the first embodiment is, for example, a parallel computer system. The information processing system 1 includes a job management node 10, a login node 11, a system management node 12, a file server 13, and multiple computing nodes 20. For example, in the first embodiment, as illustrated in FIG. 1, the computing nodes 20 are consisted to have a two dimensional mesh network structure.

In the first embodiment, the computing nodes 20 have a two dimensional mesh network structure; however, the computing nodes 20 may also have a network structure other than this. Furthermore, FIG. 1 illustrates the computing nodes 20 that has an 8×8 two dimensional mesh network structure; however, the number of nodes is not limited thereto and, furthermore, the overall shape is not limited to a square. In a description below, when the multiple computing nodes 20 are collectively represented as a unit, the multiple computing nodes 20 are sometimes referred to as a "computing node group".

The login node 11 receives an input of a job document in which an execution condition of a job is described from a user who uses the information processing system 1. Then, the login node 11 sends the acquired job document to the job management node 10. In the job document, a file path of an application, which is specified by the user to execute, and the number of computing nodes 20 needed for execution are described.

The system management node 12 performs the overall management of the operation of the computing nodes 20, such as boot up and shut down control of nodes, acquisition of an error log, or the like.

The file server 13 is a shared file system. The files in the file server 13 can be shared with the job management node 10, the login node 11, the system management node 12, and the computing node 20, and furthermore, can be shared with a computer system outside the information processing system 1. For example, when the computing nodes 20 perform calculation, the computing nodes 20 perform the calculation by using data stored in the file server 13.

A job manager that is job management software is operated in the job management node 10 that is a management device.

A state in which a user requests to execute an application as a job to the job manager is referred to as "job submission". In general, the "job submission" is performed from the login node 11. A user logs in the login node; prepares a job document file in which a file path of an application, a file path of an input/output data file, the number of computing nodes needed for execution, information on software related to the execution, and the like are described; specifies the job document file to the job manager running in the job management node 10; and then requests to execute a job. The job manager receives the job document from the login node 11 and receives a request for the job to be executed. In some cases, a state in which the job manager receives a request for a job by receiving a job document that is input by a user is referred to as "job submission". When a job is submitted, the job manager interprets the job document and acquires a job execution condition, such as the number of computing nodes 20 that are used for the job. Then, the job manager performs job scheduling that includes determination of the computing nodes 20 to which the job is allocated. Allocation of a job will be described in detail later. The login node 11, the job management node 10, and the system management node 12 may be integrated as a single node depending on a system.

At this point, in the computing nodes 20, a job management daemon that is a process that launches processing in response to a request from the job manager is always running. When a need for a computing node group to be used is acquired and a job execution condition is met, the job manager requests the job management daemon in a computing node group that is to be used and that is determined at the job scheduling described above to execute the application that has been specified by the job document file.

When the execution of the application has been ended in the computing nodes 20, the job management daemon notifies the end of the application to the job manager running on the system management node 12. When the job manager receives a notification of the end of the application from all of the computing nodes 20 for which the execution of the application of the job is requested, the job manager performs post-processing, such as transferring calculation results and then the information processing system 1 ends the execution of the job.

Figure 2:
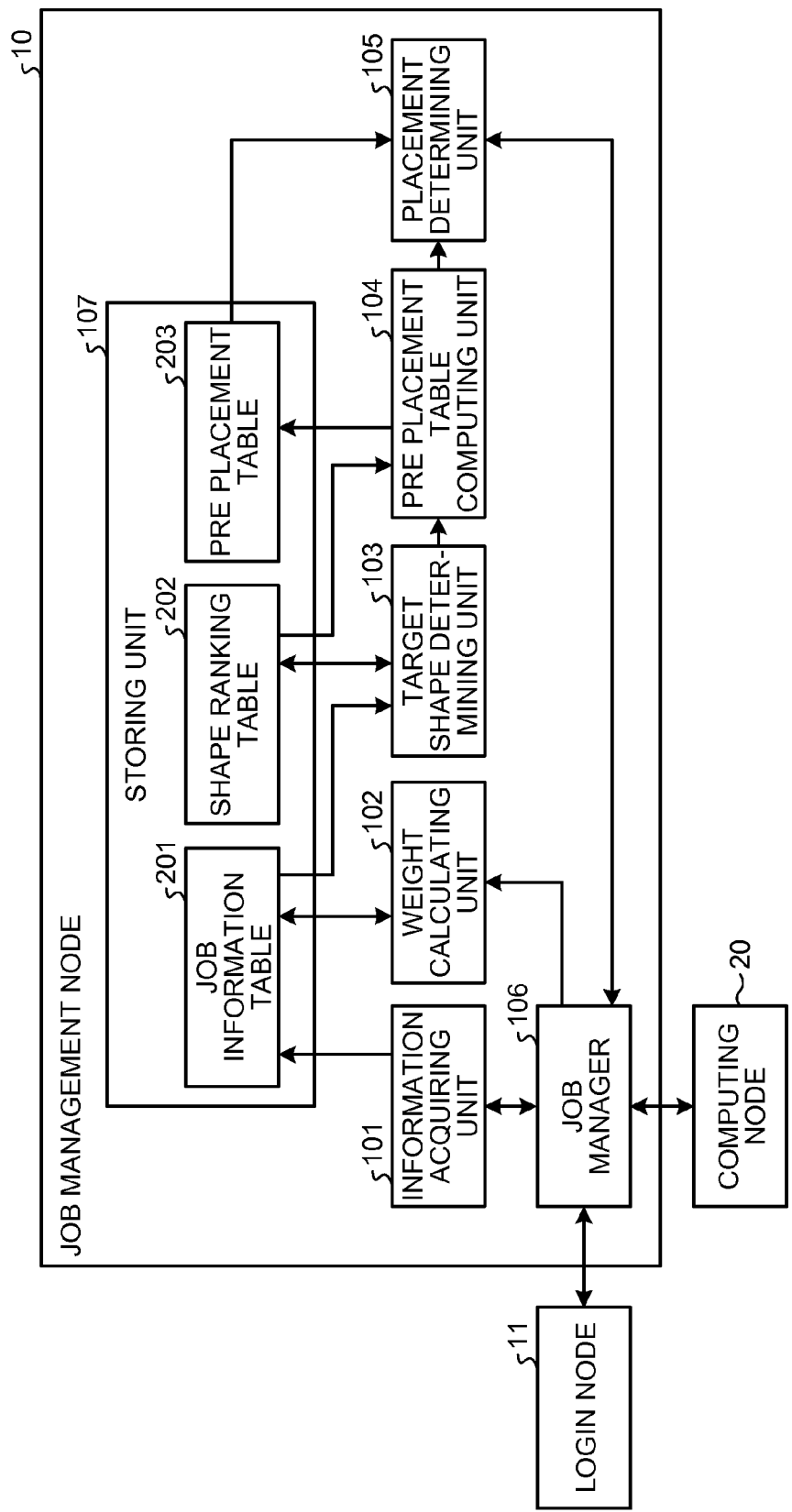
FIG. 2 is a block diagram illustrating, in detail, a job management node according to a first embodiment.

In the following, job management performed by the job management node 10 will be described in detail with reference to FIG. 2. FIG. 2 is a block diagram illustrating, in detail, a job management node according to a first embodiment.

As illustrated in FIG. 2, the job management node 10 includes an information acquiring unit 101, a weight calculating unit 102, a target shape determining unit 103, a pre placement table computing unit 104, an placement determining unit 105, a job manager 106, and a storing unit 107.

The storing unit 107 includes therein a job information table 201, a shape ranking table 202, and a pre placement table 203. The job information table 201, the shape ranking table 202, and the pre placement table 203 will be described in detail later.

The information acquiring unit 101 acquires, from the job manager 106, the shape of a job (hereinafter, referred to as a "job shape") that is allocated by the job manager 106, which will be described later, to the computing node 20, the execution time period of each job. Then, the information acquiring unit 101 adds the frequency of appearance obtained in a predetermined time period to each job shape and calculates the sum total of the frequency of appearance for each job shape. The sum total of the frequency of appearance for each job shape corresponds to an example of the "frequency of submission". The information acquiring unit 101 registers, in the job information table 201 stored in the storing unit 107, the sum total of the frequency of appearance for each job shape.

Furthermore, the information acquiring unit 101 adds the execution time period of a job performed for a predetermined time period to each job shape, stores the addition result, and then calculates the sum total of the execution time period. Thereafter, the information acquiring unit 101 registers, in the job information table 201 stored in the storing unit 107, the sum total of the execution time period for each job shape (subtotal of execution time period). At this point, the predetermined time period mentioned here is, for example, a time period for one month before, starting from one week after the time point at which the weight calculating unit 102, which will be described later, performs weight calculation.

FIG. 3 is a schematic diagram illustrating an example of a job information table. The information acquiring unit 101 registers, for example, the length of the long sides and the short sides of a job shape in the job in table 201, thereby specifying a job shape. FIG. 3 illustrates the job information table 201 that is used when a two-dimensional network is used. However, when a three-dimensional or a higher dimensional network is used, a job shape can also be represented by listing the length of each of the dimensions.

Furthermore, FIG. 3 is an example of a case of creating the job information table 201 in the order of the job shape submits. In such a case, the size of the job information table 201 is unfixed depending on submission state of a job. However, it is possible to use the job information table 201 in which all of the job shapes are covered by using all of the combinations of the size of each side of job shapes. In such a case, the size of the job information table 201 is fixed.

Furthermore, in the first embodiment, the information acquiring unit 101 calculates the weight of each of the job shapes immediately after all pieces of information on the job shapes within a predetermined period are received and then registers the weights in the job information table 201; however, the timing at which the weight is calculated is not limited thereto. For example, the weight calculating unit 102, which will be described later, may also calculate the weight when the shape ranking table 202 is created. In such a case, an item of the weight does not need to be created in the job information table 201.

The weight calculating unit 102 acquires, every predetermined time period, the frequency of appearance and the subtotal of the execution time period for each job shape in the job information table 201. For example, the weight calculating unit 102 acquires, for each job shape emery week, the frequency of appearance and the subtotal of the execution time period.

Then, the weight calculating unit 102 sums up the frequency of appearance that is associated with each of the job shapes in a predetermined time period and then calculates the total number of submitted jobs. Furthermore, the weight calculating unit 102 sums up the subtotal of the execution time period that is associated with each of the job shapes in a predetermined time period and calculates the total sum of execution time period of all of the jobs.

Then, by dividing the subtotal of the execution time period taken for each job by the total sum of the execution time period taken for all jobs, the weight calculating unit 102 obtains the ratio of the execution time period taken for each job with a job shape to the total sum of the execution time period taken for all of the jobs. In a description below, the ratio of the execution time period taken for a job that has a certain job shape to the total sum of the execution time period taken for all of the jobs is sometimes referred to as the "occupancy of the execution time period" for that job shape.

Furthermore, by dividing the frequency of appearance of each job shape by the total number of the jobs, the weight calculating unit 102 obtains the ratio of the appearance of each job shape to the total number of the jobs. In a description below, the ratio of the appearance of each job shape to the total number of the jobs is sometimes referred to as the "percentage of the number of jobs" of that job shape.

Thereafter, for each job shape, the weight calculating unit 102 obtains a value obtained by multiplying the product of the percentage of the number of jobs and a tuning coefficient by the "occupancy of the execution time period" as the weight of each job shape. The obtained weight is an example of the "degree of influence".

For example, as the "occupancy of the execution time period" for a certain job is higher, the possibility that the job is executed is high. However, even if the "occupancy of the execution time period" is high, if the percentage of the number of jobs is low, i.e., if the frequency of appearance is low, it is conceivable that determination of placement information on that job has less meaning, i.e., the degree of influence is low. Accordingly, the weight calculating unit 102 obtains the weight by multiplying the occupancy of the execution time period by the percentage of the number of jobs.

For example, for a job shape S, $t_s$ represents the subtotal of the execution time period of the job shape S, $t_{all}$ represents the total sum of the execution time period of all of the jobs, $j_s$ represents the frequency of appearance of the job shape S, $j_{all}$ represents the total number of jobs, and $\alpha$ represents the tuning coefficient. In such a case, the weight calculating unit 102 obtains a weight $w_s$ of the job shape S by using an equation $w_s=(t_s/t_{all})\times\alpha\ (j_s/j_{all})$ where $t_s/t_{all}$ represents the "occupancy of the execution time period" for the job shape S and $j_s/j_{all}$ represents the percentage of the number of jobs that have the job shape S.

At this point, the tuning coefficient $\alpha$ is a coefficient used to perform a tuning in accordance with a submission tendency of a job with respect to the information processing system 1 and the value of the tuning coefficient $\alpha$ is shared by all of the job shapes. For example, the tuning coefficient $\alpha$ is statistically calculated basis of the result obtained by submitting a job to the information processing system 1 and executing the job. If submission tendencies of jobs differ depending on seasons or the time, it is preferable to obtain the tuning coefficient $\alpha$ in accordance with a change in the submission tendency of the jobs. Furthermore, if submission tendencies of jobs can be averaged because the submission tendencies of the jobs less depend on seasons or the time, the tuning coefficient $\alpha$ is also be automatically obtained by using a certain amount of the execution results of jobs.

The calculation of the weights of the job shapes described here is only an example and the weight may also be obtained on the basis of other various kinds of job information. For example, by multiplying a value in accordance with priority such that a weight of a job shape of a job that has a high priority, such as a job that has a high possibility of being submitted at a fixed time, is greater than the weight of the other job shapes, the job that has a high priority is made to increase its weight.

The weight calculating unit 102 calculates weight of each of the job shapes and then registers the calculated weight in the job information table 201.

The target shape determining unit 103 acquires a job shape and associated information on the weight from the job information table 201. Then, the target shape determining unit 103 sorts the job shapes in descending order of weights and creates the shape ranking table 202 illustrated in FIG. 4.

FIG. 4 is a schematic diagram illustrating an example of a shape ranking table. As illustrated in FIG. 4, the job shapes and associated weights are sorted in descending order of the weights and registered in the shape ranking table 202. Specifically, in the shape ranking table 202, the job shape is represented by using the number of nodes in the long sides and the number of nodes in the short sides. In a description below, the job shapes are represented in the shape ranking table 202 in the order the weight of a job shape is large. For example, a job shape 221 that is illustrated in FIG. 4 and that has the greatest weight is defined as a first order job shape. Furthermore, a job shape 222 that has the second greatest weight is defined as a second order job shape. Furthermore, a job shape 223 is defined as a third order job shape and a job shape 224 is defined as a fourth order job shape.

FIG. 4 illustrates the shape racking table 202 that is used when a two-dimensional network is used. However, when a three-dimensional or a higher dimensional network is used, a job shape can also be represented by listing the number of nodes in the each dimension in descending order of associated weights.

Then, the target shape determining unit 103 determines the number of job shapes, in the descending order of the weight in the shape ranking table 202, as the target for the pre job placement calculation. In the following, a description will be given, in detail, of calculating, performed by the target shape determining unit 103, the number of job shapes targeted for job placement calculation.

For example, the target shape determining unit 103 calculates the ratio of the weight of the first order job shape to the weight of the second order job shape. Then, the target shape determining unit 103 multiplies the obtained ratio by the number of nodes that are used by the first order job shape (hereinafter, referred to as the "the number of used nodes"). Furthermore, the target shape determining unit 103 sets the sum of the multiplication results and the number of used nodes in the second order job shape as the total number of used nodes that are up to the second order. Then, the target shape determining unit 103 calculates the ratio of the weight of the second order job shape to the weight of the third order job shape. Subsequently, the target shape determining unit 103 multiplies the obtained ratio by the total number of used nodes that are up to the second order. Furthermore, the target shape determining unit 103 sets the sum of the multiplication results and the number of used nodes in the third order job shape as the total number of used nodes that are up to the third order. The target shape determining unit 103 repeats the above calculation. Then, the target shape determining unit 103 performs the job placement calculation until the total number of used nodes that are up to as certain order does not exceed the total number of computing nodes 20 in the information processing system 1 or does not exceed the order in which a value does not exceeds a predetermined set value and then sets the job shapes that are up to that order as the target for the pre job placement calculation.

The calculation equation for obtaining the number of job shapes targeted for job placement calculation described above is represented by $N_i=(N_{i-1}+n_i)\ [w_i/w_{i+1}+0.5]$, where $w_i$ is a string of the weight of a job shape sorted in descending order, i is a natural number, $n_i$ is the number of used nodes in the $i^{th}$ order job shape, $N_i$ is the number of used nodes that are in up to the $i^{th}$ order job shape. Furthermore, the square brackets of $[w_i/w_{i+1}+0.5]$ are the Genes symbols and represent the following maximum integers. Namely, $[w_i/w_{i+1}+0.5]$ is a value obtained by rounding off $w_i/w_{i+1}$.

The target shape determining unit 103 repeats the calculation represented by the above equation until the calculation reaches the $k^{th}$ order in which the conditions of $N_{all} \geq N_k$ and $N_{all} \leq N_{k+1}$ are satisfied. Then, the target shape determining unit 103 uses the job shapes that are up to the $k^{th}$ order as the target for the pre job placement calculation.

The target shape determining unit 103 notifies the pre placement table computing unit 104 of the lowest order in the order of the job shapes that are targeted for the pre job placement calculation. At this point, instead of the order, the target shape determining unit 103 may also notify the pre placement table computing unit 104 of information on the smallest weight from the weight of each of the job shapes that are targeted for the pre job placement calculation. The target shape determining unit 103 corresponds to an example of a "determining unit".

The pre placement table computing unit 104 periodically receives, from the target shape determining unit 103, the lowest order of the job shape targeted for the pre job placement calculation. For example, the pre placement table computing unit 104 operates in accordance with the timing at which the weight calculating unit 102 calculates the weight. Then, the pre placement table computing unit 104 acquires, from the shape ranking table 202, the weight of the job shapes whose order is the received order or above.

Then, the pre placement table computing unit 104 determines whether the acquired job shapes are different from the job shape that is being used for the currently used pre job placement. If the acquired job shapes are different from the job shape that is being used for the currently used pre job placement, the pre placement table computing unit 104 determines whether the difference between the acquired job shape and the currently used job shape is equal to or greater than a preset threshold. If the job shapes are the same or if, even if the job shapes differ, the difference of the weight is equal to or less than the threshold, the pre placement table computing unit 104 continues to use the currently used pre job placement. Consequently, if there is little difference between the calculation result obtained when the pre job placement is calculated and the currently used pre job placement and the effect of the pre job placement calculation is low, the pre placement table computing unit 104 can reduce the processing load by avoiding the pre job placement calculation.

In contrast, if the job shapes differ or the difference of the weight is equal to or greater than the threshold, the pre placement table computing unit 104 performs the pre job placement calculation and determines a pre job placement position in which placement of a job that has the targeted job shape is previously determined. At this point, the pre placement table computing unit 104 uses a solution for a packing problem as a method for calculating a pre job placement position. In this calculation, the pre placement table computing unit 104 uses placement in which the number of unused nodes in the computing nodes 20 is the minimum.

Figure 5:
FIG. 5 is a schematic diagram illustrating an example of a pre placement table.

Then, the pre placement table computing unit 104 creates the pre placement table 203 in which information that indicates a pre job placement position of a job that has one of the job shapes is registered. The pre placement table 203 is represented by, for example, FIG. 5. FIG. 5 is a schematic diagram illustrating an example of a pre placement table.

For example, the pre placement table computing unit 104 registers information that is related to the long side and the short side of a job shape and that is used to specify a job shape targeted for the pre job placement calculation. In this example, the pre placement table 203 used for the two-dimensional network is illustrated. However, when a three-dimensional or a higher dimensional network is used, a job shape can also be represented by listing the length of each of the sides in descending order.

Furthermore, the pre placement table computing unit 104 registers the placement coordinates by associating coordinates with the job shape. In the first embodiment, the pre placement table computing unit 104 indicates the job placement coordinates of each of the job shapes by indicating the X coordinate and the Y coordinate that indicate the left corner of a job shape and by indicating the axis of the long side of the job shape. The X coordinate and the Y coordinate at this point is obtained when, for example, the upper left corner of the computing nodes 20 arrayed as a two-dimensional network illustrated in FIG. 1 is used as the origin. In the first embodiment, the job placement is indicated by using the coordinates of the upper left corner and the longitudinal direction of a job shape; however, the method of indicating job placement is not limited thereto. For example, job placement may also be indicated by using the coordinates of the upper left and the lower right corners.

The job manager 106 receives information on a job submitted by a user from the login node 11. Then, the job manager 106 accumulates the received jobs in a job queue. The job queue mentioned here is a string in which jobs that wait to be executed are sequentially accumulated and is also referred to as a job execution queue.

The job manager 106 determines whether a job that has not been executed is in a job queue. If a job that has not been executed is present, the job manager 106 uses the information related to the top job in the job queue as a job targeted for placement. Then, the job manager 106 requests the placement determining unit 105 to perform the job placement.

The placement determining unit 105 determines whether the job shape of the job requested by the job manager 106 matches the job shape that has been target for the pre job placement calculation.

In the following, first, a description will be given of a case in which a specified job shape matches the job shape that has been targeted for the pre job placement calculation. If the job shapes do match, the placement determining unit 105 refers to the pre placement table 203 and specifies a pre job placement position of a job that has the target job shape. Then, the placement determining unit 105 determines whether another job has already been executed at the pre job placement position of the job that has the target job shape. At this point, if multiple job shapes for jobs that are targeted for placement are present when the pre job placement calculation is performed, the placement determining unit 105 determines whether another job has already been executed for each of the pre job placement positions.

If a pre job placement position in which a job associated with the job shape of the job that is targeted for the placement is not being executed is present, the placement determining unit 105 notifies the job manager 106 of the placement of the job that is targeted for the placement to the pre job placement position. The placement determining unit 105 retains information indicating that the job is being executed at the job placement position that is targeted for the placement and that is sent as a notification to the job manager 106.

In contrast, if jobs are being executed in all of the pre job placement positions that have the job shapes of the jobs targeted for placement, the placement determining unit 105 determines placement by performing the same process as that performed when a job shape of a job targeted for placement does not match the job shape targeted for the pre job placement calculation.

Accordingly, in the following, a description will be given of a case in which a specified job shape does not match the job shape that is targeted for the pre job placement calculation. In such a case, for example, the placement determining unit 105 places and executes a job called backfill, which will be described below in detail.

The placement determining unit 105 specifies an area in which job placement has not been performed in pre job placement. Then, the placement determining unit 105 determines whether an area in which a job has not been executed is present in the specified area.

If an area in which a job has not been executed is present, the placement determining unit 105 determines whether a job targeted for placement can be included in that area, i.e., can be placed in that area. If the job can be placed in that area, the placement determining unit 105 determines placement of the job that is targeted for the placement such that an placement condition, in which, for example, the number of unused nodes that will be present after the placement is the maximum, is satisfied and then notifies the job manager 106 of the determination result. The placement determining unit 105 retains information indicating that the job is being executed at the job placement position that is targeted for the placement and that is sent as a notification to the job manager 106.

In contrast, if a job targeted for placement is not placed in the area in which job placement is not performed at the time of pre job placement, the placement determining unit 105 performs the following processing. Namely, the placement determining unit 105 determines whether an area that can include a job targeted for placement is present in an area in which a single job has been arranged at the time of pre job placement and another job is not executed. If the target area is present, the placement determining unit 105 specifies an area in which the difference between the number of computing nodes 20 included in that area and the number of computing nodes 20 that are used by a job targeted for the placement is the minimum. Then, the placement determining unit 105 determines placement of the job that is targeted for the placement and that is in an area that is specified such that the placement condition in which the number of unused nodes that will be present after the placement is the maximum is satisfied and then notifies the job manager 106 of the determination result. The placement determining unit 105 retains information indicating that the job is being executed at the placement position of the job that is targeted for the placement and that is sent as a not to the job manager 106.

In contrast, if the area is not present, the placement determining unit 105 creates a connection area by connecting an area, in which a single job is placed at the pre job placement, to the adjacent area, in which another job is not being executed. Then, the placement determining unit 105 determines whether an area that can include a job targeted for placement is present in the connection area. If the target connection area is present, the placement determining unit 105 specifies a connection area in which the difference between the number of computing nodes 20 included in the connection area and the number of computing nodes 20 used by the job targeted for the placement is the minimum. Then, the placement determining unit 105 determines the placement of the job targeted for the placement in the connection area that is specified such that the placement condition in which, for example the number of unused nodes that will be present after the placement is the maximum, is satisfied and then notifies the job manager 106 of the determination result. The placement determining unit 105 retains information indicating that the job is being executed at the placement position of the job that is targeted for the placement and that is sent as the notification to the job manager 106.

In the following, an example of creating a connection area will be described. For example, the placement determining unit 105 specifies an adjacent area that can be connected in an area in which a single job has been placed at the time of pre job placement and another job is not being executed. Then, the placement determining unit 105 selects a method of connecting combinations of areas such that, if a specified area is connected to an area and the created area is determined to be an area that can include a job targeted for placement, the number of combinations of connected areas in each of which a single job is placed at the time of pre job placement is small. If the number of combinations of connected areas is the same, the placement determining unit 105 selects a combination of connected areas such that, when a job targeted for placement is placed in the areas, the number of remaining connected areas is small.

In contrast, if the job targeted for the placement does not satisfy the placement conditions described above, the placement determining unit 105 determines that it is difficult to place the job targeted for the placement. Then, the placement determining unit 105 notifies the job manager 106 of information indicating that the placement of the job is not available.

Then, the job manager 106 that has received the information indicating that the placement of the job is not available determines whether the subsequent job or a job with a low priority is to be executed first in accordance with a scheduling policy. If a scheduling policy in which another job is not executed first is used, the job manager 106 waits until the other job that is being executed ends its operation and, when the job ends its operation, the job manager 106 again requests the placement determining unit 105 to place the top job in the job queue and repeats this operation until the job is placed.

Furthermore, the placement determining unit 105 acquired, from the job manager 106, information on a job that has been executed. Then, the placement determining unit 105 determines that the position in which the executed job has been placed shifts to a state in which a job is not yet executed.

In contrast, in a scheduling policy in which another job that is waiting to be executed is allowed to be executed in advance, the job manager 106 selects, in accordance with the scheduling policy, a job candidate that is executed, in advance, by using a conventional method, such as backfill, and requests the placement determining unit 105 to place the candidate job. If the candidate job is not able to be placed, the job manager 106 tries to place another candidate in accordance with the scheduling policy or waits until another job that is currently being executed ends its operation. The placement determining unit 105 corresponds to an example of a "job placement unit".

The job manager 106 receives, from the placement determining unit 105, information on a job to be placed and on the job placement position. Then, the job manager 106 allocates the job to one of the computing nodes 20 corresponding to the specified placement position and allows the allocated node to execute the job. At this point, the job manager 106 notifies the information acquiring unit 101 of the executed job.

Then, the job manager 106 receives a notification from the computing node 20 indicating that the executed job has been completed. The job manager 106 notifies the placement determining unit 105 of information the completed job. Furthermore, the job manager 106 calculates the time period from when the job is allocated to when the job has been completed and thus calculates the execution time period of the job. Thereafter, the job manager 106 notifies the information acquiring unit 101 of the calculated execution time period of the job together with identification information on the job.

The information acquiring unit 101, the weight calculating unit 102, the target shape determining unit 103, the pre placement table computing unit 104, and the placement determining unit 105 described above can be implemented as a job placement function of a job manager performed by an arithmetic processing unit in the job management node 10.

Figure 6:
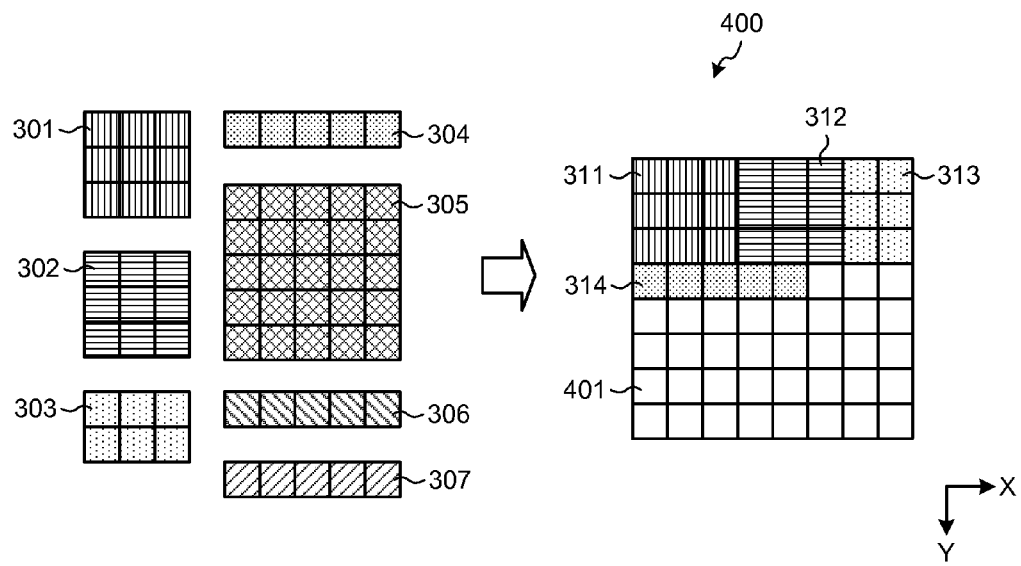
FIG. 6 is a schematic diagram illustrating an example of placement of a job performed by using a conventional method.
Figure 7:
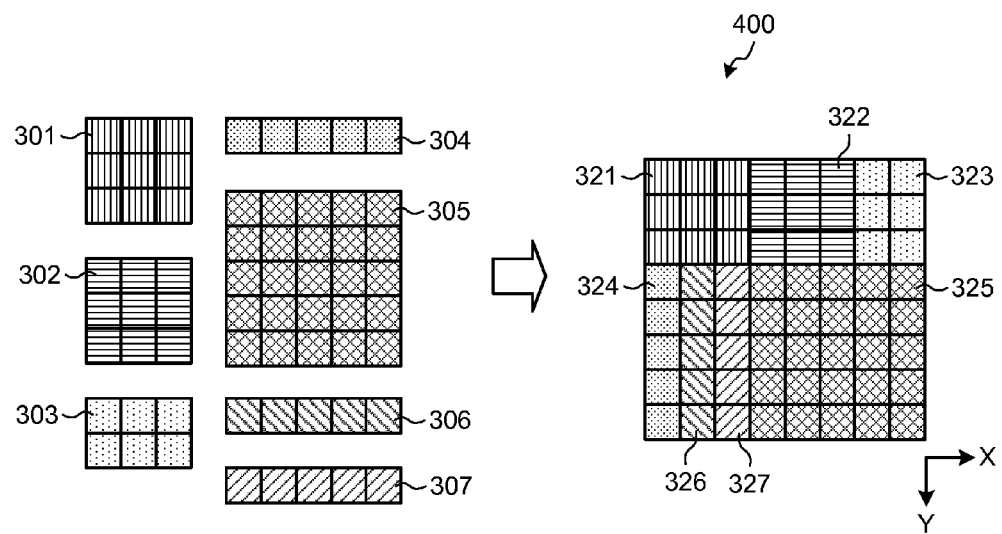
FIG. 7 is a schematic diagram illustrating an example of placement of a job performed by the information processing system according to the first embodiment.

In the following, an example of job placement performed by the information processing system according to the first embodiment will be described with reference to FIGS. 6 and 7. FIG. 6 is a schematic diagram illustrating an example of placement of a job performed by using a conventional method. FIG. 7 is a schematic diagram illustrating an example of placement of a job performed by the information processing system according to the first embodiment.

First, a case in which a job is arranged by using a conventional method will be described with reference to FIG. 6. In the following, a description will be given of a case in which jobs in job shapes 301 to 307 are sequentially submitted in the numerical order in an 8×8 computing node group 400. In this case, a method used, as a conventional method, for arranging job is a method in which jobs are arranged such that the size of a single unused area that is to be connected is as large as possible and the number of the computing nodes 20 that have not been used and that are adjacent in the downward direction is as great as possible.

First, the job in the job shape 301 is arranged in an area 311 at the upper left corner of the computing node group 400. Then, the job in the job shape 302 is arranged in an area 312 in the computing node group 400 by avoiding the job from being used by the computing nodes 20 located in the downward direction. Then, the job in the job shape 303 is arranged on the right side of the area 312 by rotating the job by 90 degrees. Then, the job in the job shape 304 is placed, in accordance with the placement rule, in an area 314 that is located below the area 311.

Thereafter, the job in the job shape 305 with the length of 5 on its long side and short side is submitted. However, only an unused area 401, whose shape is not rectangular, is left in the computing node group 400. In the area 401, the job in a shape with the length of 5 on its long side and short side is not able to be arranged. Consequently, the job in the job shape 305 needs to wait and thus processing is delayed. Furthermore, with a scheduling policy in which a subsequent job is not allowed to be executed in advance, although unused nodes that satisfy the job shape condition are present, the jobs in the job shapes 306 and 307 are not able to be arranged nor executed due to the scheduling policy, and thus processing is delayed until the execution of the job in the job shape 305 is started.

In the following, an example of job placement performed by the information processing system 1 according to the first embodiment will be described with reference to FIG. 7. In this case, similarly to FIG. 6, a description will be given on a case in which the jobs in the job shapes 301 to 307 are sequentially submitted in the numerical order in the 8×8 computing node group 400.

In this case, it is assumed that the order of the weight of the job shapes 301 to 307 is high and it is assumed that the pre placement table computing unit 104 determines a pre job placement position of the job in each of the job shapes 301 to 307 by using the pre job placement calculation. Specifically, the pre placement table computing unit 104 determines a pre job placement position such that the jobs in the job shapes 301 to 307 are placed in areas 321 to 327, respectively, in the computing node group 400.

First, the placement determining unit 105 places, in accordance with the pre job placement, the job in the job shape 301 in the area 321 at the upper left of the computing node group 400. Then, the placement determining unit 105 places, is accordance with the pre job placement, the job in the job shape 302 in an area 322 in the computing node group 400. Then, the placement determining unit 105 places, in accordance with the pre job placement, the job in the job shape 303 in the area 323. Then, the placement determining unit 105 places, in accordance with the pre job placement, the job in the job shape 304 in the area 324 in the computing node group 400. Then, the placement determining unit 105 places, in accordance with the pre job placement, the job in the job shape 505 in the area 325 in the computing node group 400. Then, the placement determining unit 105 places, in accordance with the pre job placement, the job in the job shape 306 in the area 326 in the computing node group 400. Then, the placement determining unit 105 places, in accordance with the pre job placement, the job in the job shape 307 in the area 327 in the computing node group 400.

As described above, with the information processing system according to the first embodiment, even when, in the conventional job arrangement method, a job needs to be wait due to fragmentation, by arranging jobs in accordance with the arrangement that is determined in advance, the jobs can be placed in computing nodes without waste.

Figure 8:
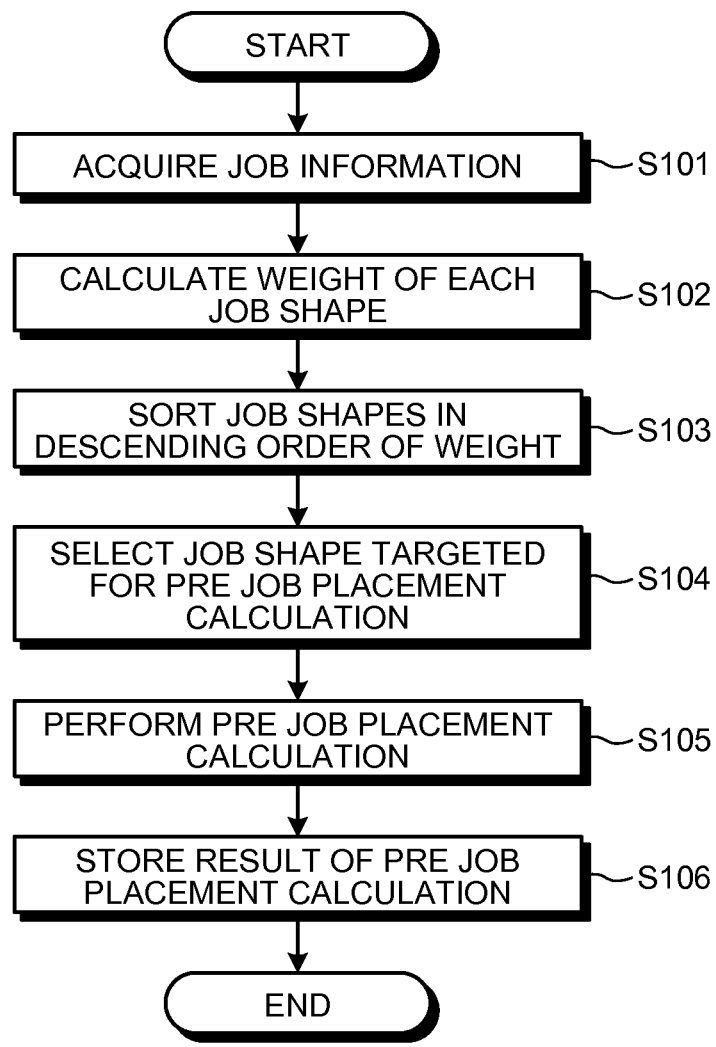
FIG. 8 is a flowchart illustrating the flow of a pre placement calculating process performed by a job management node.

In the following, pre job placement processing performed by the job management node 10 according to the first embodiment will be described with reference to FIG. 8. FIG. 8 is a flowchart illustrating the flow of a pre placement calculating process performed by a job management node.

The information acquiring unit 101 acquires, from the job manager 106, job information that includes therein a job shape and the execution time period of the job (Step S101). Then, the information acquiring unit 101 updates the job information table 201 by using the acquired job information.

The weight calculating unit 102 acquires, from the job information table 201, the frequency of appearance of each job shape and the execution time period of each job. Then, the weight calculating unit 102 calculates the weight of each of the job shapes (Step S102). Then, the weight calculating unit 102 registers the weight of each job shape in the job information table 201.

The target shape determining unit 103 sorts the job shapes in descending order of the weight (Step S103). Then, the target shape determining unit 103 registers the result of the sorting in the shape ranking table 202.

The target shape determining unit 103 specifies the lowest order of the job shape that is targeted for the pre job placement calculation. Then, the target shape determining unit 103 selects, as job shapes that are targeted for the pre job placement calculation, job shapes with the order that is equal to or higher than the specified lowest order (Step S104). The target shape determining unit 103 notifies the pre placement table computing unit 104 of the selected job shapes.

The pre placement table computing unit 104 performs the pre job placement calculation by calculating placement of the jobs in the job shapes targeted for the pre job placement calculation when the placement is performed at the same time in accordance with the ratio of the weight (Step S105).

The pre placement table computing unit 104 stores, in the pre placement table 203, the pre job placement position obtained from the pre job placement calculation. Consequently, the pre placement table computing unit 104 stores the result of the pre job placement calculation in the storing unit 107 (Step S106).

Figure 9:
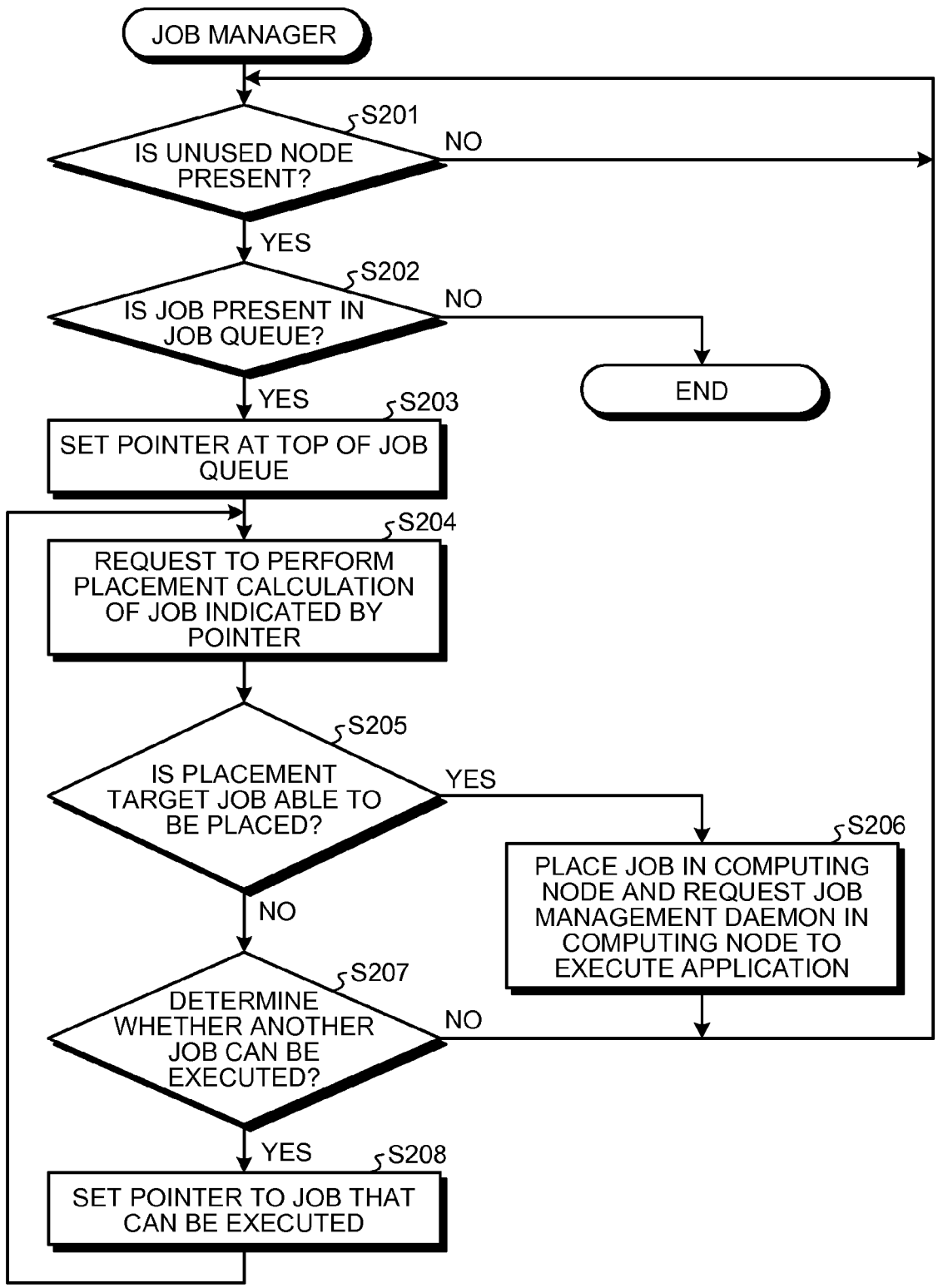
FIG. 9 is a flowchart illustrating the overall flow of job launch processing performed by a job manager according to the first embodiment.
Figure 10:
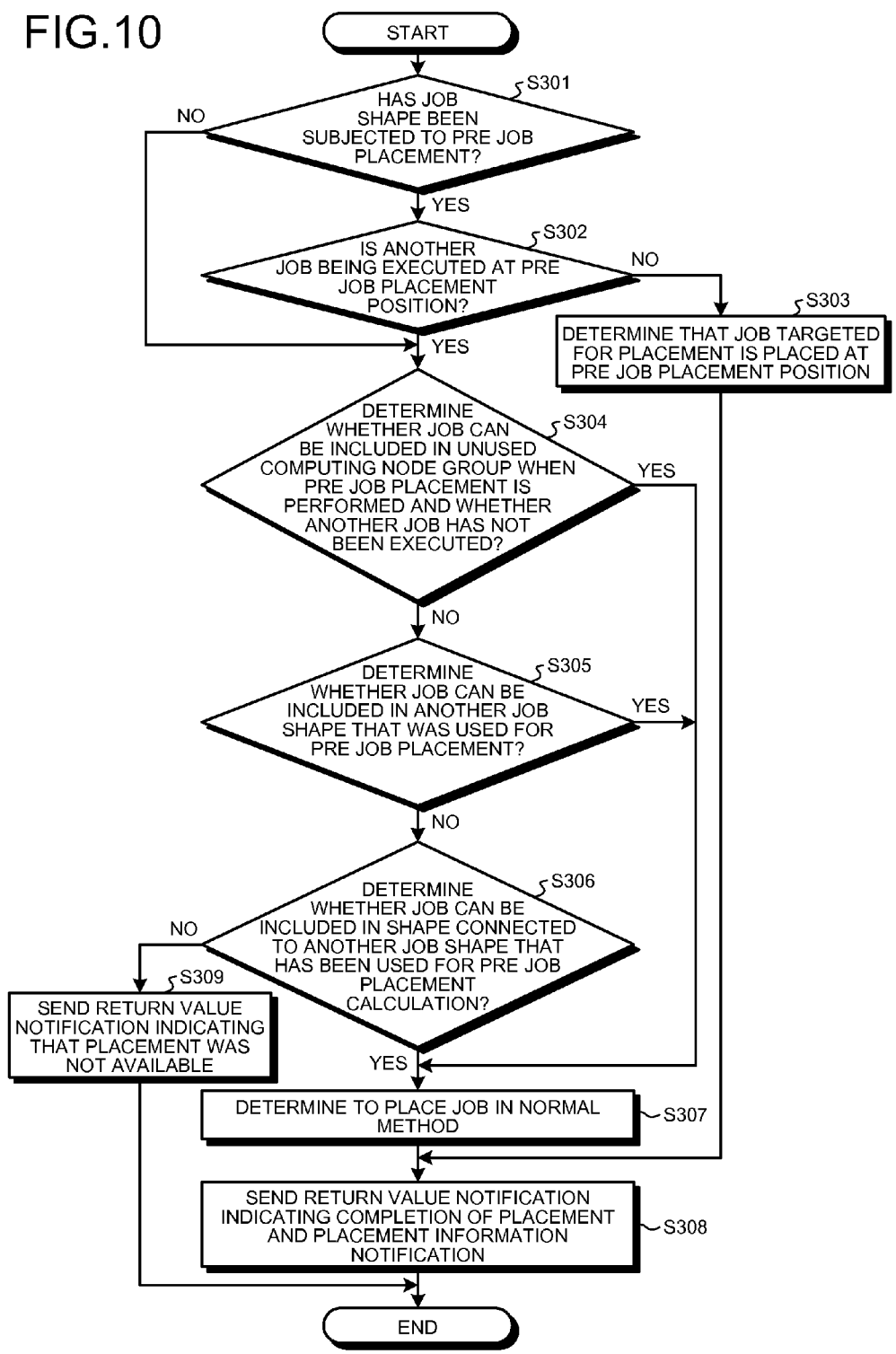
FIG. 10 is a flowchart illustrating the flow of placement processing of a job performed by a placement determining unit.

In the following, placement processing of a job performed by the job management node 10 according to the first embodiment will be described with reference to FIGS. 9 and 10. FIG. 9 is a flowchart illustrating the overall flow of job start processing performed by a job manager according to the first embodiment. FIG. 10 is a flowchart illustrating the flow of placement processing of a job performed by an placement determining unit.

The job manager 106 determines whether an unused node is present in the computing nodes 20 (Step S201). If no unused node is present in the computing nodes 20 (No at Step S201), the job manager 106 waits until an unused computing node is generated.

In contrast, if unused node is present in the computing nodes 20 (Yes at Step S201), the job manager 106 determines whether a job is present in a job queue (Step S202). If no job is present in the job queue (No at Step S202), the job manager 106 ends the job start processing.

In contrast, if a job is present in the job queue (Yes at Step S202), the job manager 106 sets a pointer at the top of the job queue (Step S203).

Then, the job manager 106 requests the placement determining unit 105 to perform placement calculation when the job that is targeted for the placement and that is indicated by the pointer (Step S204).

Then, the placement determining unit 105 reports, to the job manager 106, the information on the placement if the placement can be available or the information indicating that the placement was unavailable if the placement has failed. In response to the report from the placement determining unit 105, the job manager 106 determines whether the placement of the job targeted for the placement is available (Step S205). If the placement is available (Yes at Step S205), the job manager 106 places, in accordance with the placement information that was sent back by the placement determining unit 105, the job targeted for the placement in the computing node 20 and requests the job manager in the computing node 20 to execute the placed job placement (Step S206). Then, the job manager 106 returns to Step S201.

In contrast, if the placement is difficult (No at Step S205), the job manager 106 determines, in accordance with the scheduling policy, whether another job in the job queue can be executed (Step S207). If the other job is not able to be executed (No at Step S207), the job manager 106 returns to Step S201.

In contrast, if the policy indicates that the other job can be executed (Yes at Step S207), the job manager 106 sets a pointer to the job that is a candidate for the execution (Step S208). Then, the job manager 106 returns to Step S204.

In the following, job placement processing performed by the placement determining unit 105 will be described in detail with reference to FIG. 10. FIG. 10 is a flowchart illustrating the flow of placement processing of a job performed by an placement determining unit. Specifically, the flow illustrated in FIG. 10 is an example of the processing performed by the placement determining unit 105 when the request performed at Step S204 illustrated in FIG. 9 is received from the job manager 106.

The placement determining unit 105 determines whether the job shape of the job that is targeted for the placement is the job shape that has been subjected to the pro job placement (Step S301). If the job shape is not the job shape subjected to the pre job placement (No at Step S301), the placement determining unit 105 proceeds to Step S304.

In contrast, if the job shape is the job shape subjected to the pre job placement (Yes at Step S301), the placement determining unit 105 determines whether another job is being executed at the pro job placement position in which a job that has the same job shape as that targeted for the placement (Step S302). If the other job is not executed (No at Step S302), the placement determining unit 105 determines that the job targeted for the placement is placed at the pre job placement position in which the other job is not executed (Step S303). Then, the placement determining unit 105 proceeds to Step S308.

In contrast, If the other job is being executed (Yes at Step S302), the placement determining unit 105 determines whether the job targeted for the placement can be included in an unused computing node group when the pre job placement is performed (Step S304). However, it is assumed that the other job is not being executed in the unused computing node group determined at the pre job placement. If the job can be included (Yes at Step S304), the placement determining unit 105 determines that the job targeted for the placement is placed in the computing node group that is unused at the time of the pre job placement and that can includes the job targeted for the placement (Step S307).

In contrast, if the job is not able to be included (No at Step S304), the placement determining unit 105 determines whether the job targeted for the placement can be included in another job shape that was used for the pre job placement (Step S305). However, it is assumed that another job is not executed at the placement position of the other job shape that was used at the time of the pre job placement. If the job can be included (Yes at Step S305), the placement determining unit 105 determines that the job targeted for the placement is placed in the placement position that has another job shape used at the time of the pre job placement and that can include the job targeted for the placement (Step S307).

In contrast, if the job is hard to be included (No at Step S305), the placement determining unit 105 determines whether the job targeted for the placement can be included in a connection shape that was created by connecting another adjacent job shape that was used for the pre job placement (Step S306). However, it is assumed that another job is executed at a position where the connection shape is placed. If the job can be included at Step S306), the placement determining unit 105 determines that the job targeted for the placement is placed at the placement position that has a connection shape and that can include the job targeted for the placement (Step S307).

Then, the placement determining unit 105 notifies the job manager 106 of the placement position, as a return value, that has been determined as the placement completion information (Step S308).

In contrast, if it is difficult to include the job targeted for the placement in the connection shape (No at Step S306), the placement determining unit 105 notifies the job manager 106 that, as a return value, the placement was not able to be performed (Step S309).

As described above, the job management node, which is a management device, according to the first embodiment determines, in accordance with statistical information, a job shape that is frequently appear and in which the significance of pre placement is high and then determines, in advance, an optimum placement position for the determined job shape. When a job is submitted, if the submitted job has the same job shape as that targeted for pre placement calculation, by arranging the submitted job in the previously calculated placement position, the number of unused computing nodes used for job placement can be reduced and thus the usability of computing nodes can be improved. Furthermore, for the job shape whose position is previously determined, placement calculation may sometimes be unneeded, which improves the throughput of the submitting of jobs.

[b] Second Embodiment

In the following, a job management node according to a second embodiment will be described. The job management node according to the second embodiment differs from the first embodiment in that job management node according to the second embodiment detects a variation in the tendency of a submitted job and recalculates the pre job placement. The job management node 10 according to the second embodiment is also represented by the block diagram illustrated in FIG. 2. In a description bellow, the components having the same function as that performed in the first embodiment will not be described.

If the job manager 106 executes jobs the number of which is a certain rate of jobs that were targeted for the previous weight calculation, the weight calculating unit 102 performs the weight calculation. For example, the weight calculating unit 102 performs weight calculation when the job manager 106 executes jobs the number of which is 10% of the jobs that were targeted for the previous weight calculation.

For example, the weight calculating unit 102 includes a recalculation trigger counter that is used to count the number of executed jobs. The weight calculating unit 102 receives a notification from the job manager 106 indicating that a job has been executed. Then, the weight calculating unit 102 increments the recalculation trigger counter. Then, the weight calculating unit 102 determines whether a value of the recalculation trigger counter reaches 10% of the number of jobs targeted for the immediately previous weight calculation. If the value reaches 10% of the number of jobs, the weight calculating unit 102 executes the weight calculation. In contrast, if the value does not reach 10% of the number of jobs, the weight calculating unit 102 waits until a notification is received from the job manager 106 indicating that the subsequent job is to be executed.

If the weight calculating unit 102 executes the weight calculation, the target shape determining unit 103 sorts the job shapes and selects a job shape that is used for the pre job placement.

In the second embodiment, the weight calculation and a job shape selection were executed by using the number of executed jobs as a reference. This is because, if the number of executed jobs is small, the weight calculating unit 102 and the target shape determining unit 103 are not able to ascertain a change in a tendency of a submitted job. Specifically, in the second embodiment, in order to accurately ascertain a change in a tendency of a submitted job, the weight calculating unit 102 and the target shape determining unit 103 executes the weight calculation and the selection of a job shape by using the number of executed jobs as a reference; however, another kind of information may also be used for the reference information. For example, similarly to the first embodiment, the weight calculating unit 102 and the target shape determining unit 103 may also execute the weight calculation and the selection of a job shape every predetermined time period.

The pre placement table computing unit 104 periodically acquires, from the shape ranking table 202, a job shape targeted for the pre job placement calculation, the order of each job shape, and the weight of each job shape. The pre placement table computing unit 104 stores therein the acquired information until the subsequent information is acquired.

Furthermore, the pre placement table computing unit 104 stores therein a type threshold that is used to determine whether recalculation is to be executed on the basis of the type of job shape. Furthermore, the pre placement table computing unit 104 stores therein a weight threshold that is used to determine whether recalculation is to be executed on the basis of the difference between the weights of job shapes.

The pre placement table computing unit 104 compares the information that is immediately previously acquired with the information that is acquired this time. If the number of job shapes having different shapes, from among the job shapes that are in a higher rank, between the job shapes that are immediately previously acquired and the job shapes acquired this time is equal to or greater than a shape difference threshold, the pre placement table computing unit 104 detects a change in the job tendency.

Furthermore, if the number of job shapes having different shapes is less than the shape difference threshold, the pre placement table computing unit 104 detects an unchanged status in the job tendency.

If the pre placement table computing unit 104 detects a change in the job tendency, the pre placement table computing unit 104 re-executes the pre job placement calculation. The pre placement table computing unit 104 re-executes the pre job placement calculation by using a solution for a packing problem, which is similarly to the first embodiment.

Figure 11:
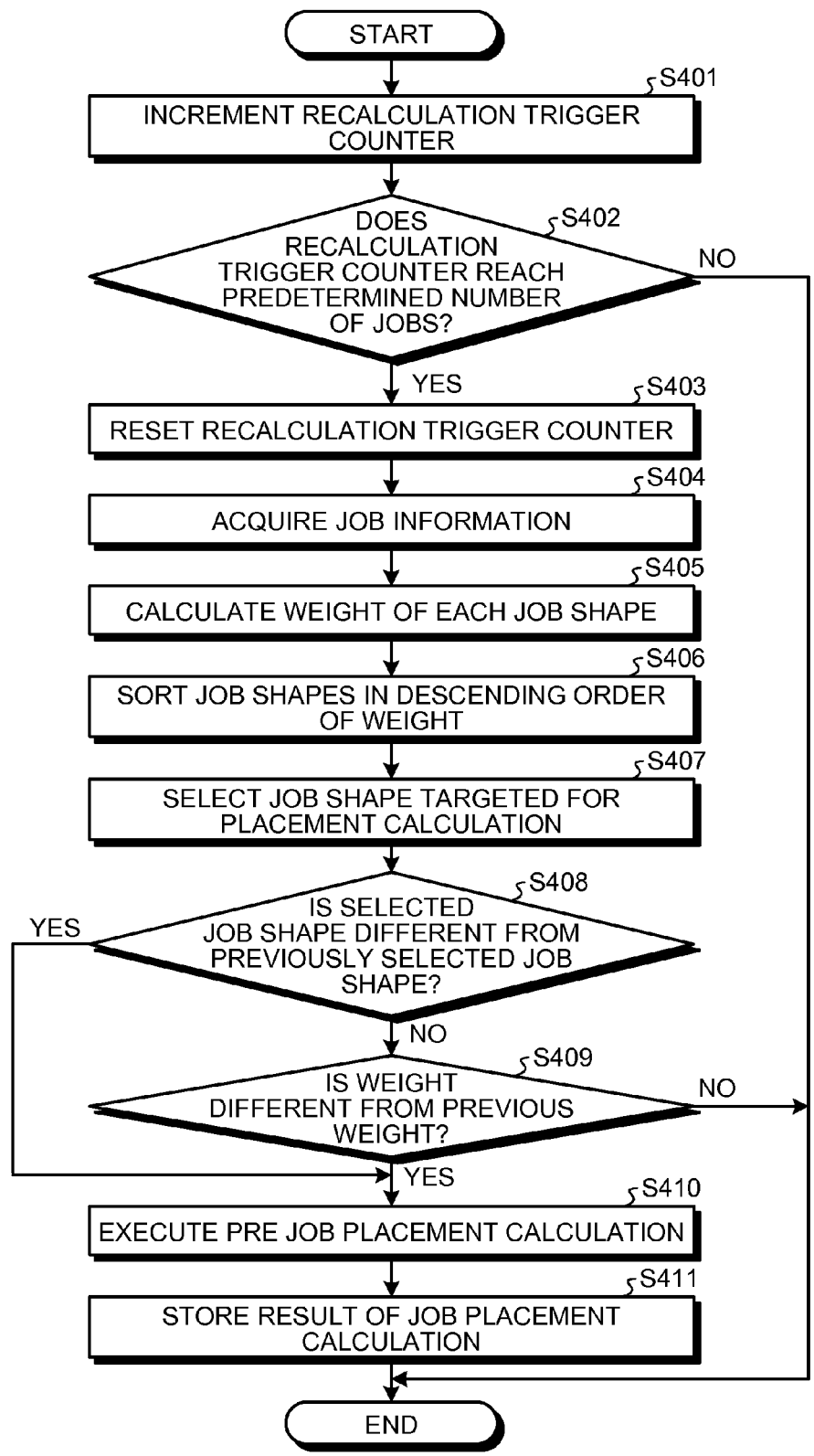
FIG. 11 is a flowchart illustrating the flow of a pre job placement calculating process performed by a job management node according to a second embodiment.

In the following, a pre job placement calculating process performed by the job management node 10 according to the second embodiment will be described with reference to FIG. 11. FIG. 11 is a flowchart illustrating the flow of a pre job placement calculating process performed by a job management node according to a second embodiment.

In response to job execution received from the job manager 106, the weight calculating unit 102 increments the recalculation trigger counter (Step S401).

Then, the weight calculating unit 102 determines whether the recalculation trigger counter reaches a predetermined number of jobs (Step S402). If the counter does not reach the predetermined number of jobs (No at Step S402), the job management node 10 ends the pre job placement calculating process.

In contrast, if the counter reaches the predetermined number of jobs (Yes at Step S402), the weight calculating unit 102 resets the recalculation trigger counter (Step S403).

Then, the weight calculating unit 102 acquires, from the job information table 201, job information that includes the frequency of appearance the total execution time period of each of the job shapes (Step S404).

Then, the weight calculating unit 102 calculates the weight of each of the job shapes (Step S405). Thereafter, the weight calculating unit 102 registers the weight of each of the job shapes in the job information table 201.

After the weight calculating unit 102 executed the weight calculation, the target shape determining unit 103 acquires the weight of each of the job shapes from the job information table 201. Then, the target shape determining unit 103 sorts the job shapes in descending order of the weight (Step S406). Then, the target shape determining unit 103 registers the result of the sort in the shape ranking table 202.

The target shape determining unit 103 specifies the lowest order of the job shape that is targeted for the pre job placement calculation. Then, the target shape determining unit 103 selects the specified and the lowest order of the job shape as the job shape that is targeted for the pre job placement calculation that is to be performed this time (Step S407). Furthermore, the target shape determining unit 103 stores the weight of the job shape selected this time and the weight of each of the job shapes.

Then, the target shape determining unit 103 compares the type of stored job shape that is immediately previously selected with the stored job shape that is selected this time. Then, the target shape determining unit 103 determines whether the selected job shape is different from the job shape that is immediately previously selected on the basis of whether the number of job shapes having different shapes exceeds the shape difference threshold (Step S408). If the selected job shape is different from the job shape that is immediately previously selected (Yes at Step S408), the target shape determining unit 103 detects a change in the tendency of the job that is to be submitted and then proceeds to Step S410.

In contrast, if the selected job shape is not different from the job shape that is immediately previously selected (No at Step S408), the target shape determining unit 103 compares the weight of each of the stored immediately previously selected job shapes with the weight of each of the job shapes that are selected this time. Then, the target shape determining unit 103 determines whether the weight is different from the previous weight on the basis of whether the difference of the weight of the job shape exceeds the weight threshold (Step S409). If the selected job shape is the same as that immediately previously selected (No at Step S409), the target shape determining unit 103 ends the pre job placement calculating process.

In contrast, if the selected job shape is different from that immediately previously selected (Yes at Step S409), the target shape determining unit 103 determines that the target shape determining unit 103 has detected a change in the tendency of the job that is to be submitted and then proceeds to Step S410.

The pre placement table computing unit 104 executes the pre job placement calculation by calculating the placement of jobs in the job shapes that are targeted for the pro job placement calculation that is simultaneously performed in accordance with the ratio of the weight (Step S410).

The pre placement table computing unit 104 stores the pre job placement positions obtained by the pre job placement calculation in the pre placement table 203. Consequently, the pre placement table computing unit 104 stores the result of the pre job placement calculation in the storing unit 107 (Step S411).

As described above, the job management node that is the management device according to the second embodiment recalculates pre job placement in response to a change in the tendency of a job that is to be submitted. For example, when recalculation is periodically performed, in a system in which a change in the job tendency is small, the calculation may possibly be wasted if recalculation of pre job placement is repeatedly performed. Furthermore, in a system in which a change is significant, the difference between recalculation is large, and thus a decrease in the use efficiency of the resources is not possibly be improved. However, by performing pre job placement in accordance with the tendency of a job that is to be submitted, the job management node according to the second embodiment can implement a reduction in the processing load applied due to the calculation and an improvement in the use efficiency of the resources.

(Hardware Configuration)

Figure 12:
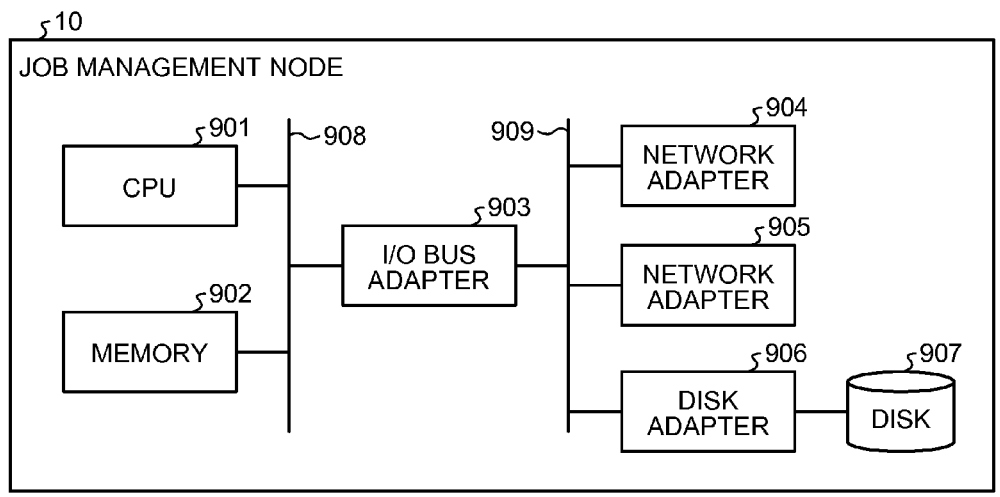
FIG. 12 is a schematic diagram illustrating the hardware configuration of a job management node.

In the following, the hardware configuration of the job management node 10 according to each of the embodiments will be described with reference to FIG. 12. FIG. 12 is a schematic diagram illustrating the hardware configuration of a job management node.

The job management node 10 includes a CPU 901, a memory 902, an input/output (I/O) bus adapter 903, network adapters 904 and 905, a disk adapter 906, and a disk 907.

The memory 902 and the I/O bus adapter 903 are connected to the CPU 901 by a system bus 908.

The I/O bus adapter 903 is connected to the network adapters 904 and 905 and the disk adapter 906 via an I/O bus 909.

The network adapter 904 is connected to an external network outside the information processing system 1. Furthermore, the network adapter 905 is connected to an internal network in information processing system 1. Specifically, the job management node 10 communicates with the computing node 20 via the network adapter 905. The CPU 901 sends and receives data to and from the network, is the I/O bus adapter 903, that is connected to the network adapters 904 and 905.

The disk adapter 906 is connected to the disk 907. The disk 907 is a storage device, such as a hard disk or the like, and implements the function performed by the storing unit 107 illustrated in FIG. 2. The CPU 901 reads and writes data from and in the disk 907 via the I/O bus adapter 903 and the disk adapter 905. Furthermore, the disk 907 stores therein various programs that is used to implements processing performed by the information acquiring unit 101, the weight calculating unit 102, the target shape determining unit 103, the pre placement table computing unit 104, the placement determining unit 105, and the job manager 106 illustrated in FIG. 2.

The CPU 901 and the memory 902 implement the functions performed by, for example, the information acquiring unit 101, the weight calculating unit 102, the target shape determining unit 103, the pre placement table computing unit 104, the placement determining unit 105, and the job manager 105 illustrated in FIG. 2. For example, the CPU 901 reads the various programs stored in the disk 907, loads the programs in the memory 902, and then creates processes that implement the functions described above. Then, the CPU 901 implements each of the functions by executing the processes in the memory 902.

Figure 13:
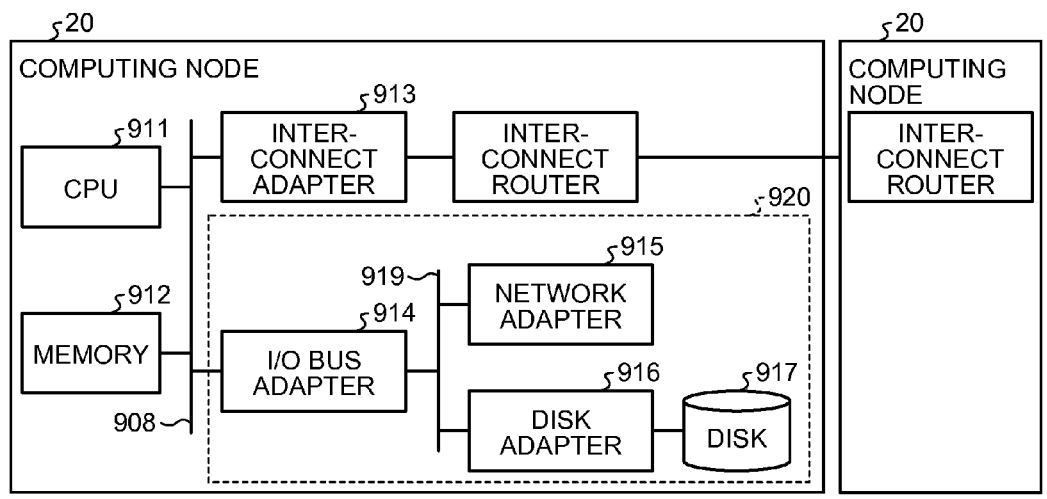
FIG. 13 is a schematic diagram illustrating the hardware configuration of a computing node.

In the following, the hardware configuration of the computing node 20 according to each of the embodiments will be described with reference to FIG. 13. FIG. 13 is a schematic diagram illustrating the hardware configuration of a computing node.

The computing node 20 includes a CPU 911, a memory 912, an interconnect adapter 913, an interconnect router 918, an I/O bus adapter 914, a network adapter 915, a disk adapter 916, and a disk 917. However, FIG. 13 illustrates an example of the hardware configuration of the computing node 20. For example, the computing node 20 that does not have the units in an area 920 represented by the dotted line may also be present.

The memory 912, the interconnect adapter 913, and the I/O bus adapter 914 are connected to the CPU 511 via the system bus 908.

The I/O bus adapter 914 is connected to the network adapter 915 and the disk adapter 916 via an I/O bus 919.

The interconnect router 918 is connected to the interconnect router 918 in the adjacent computing node 20. The CPU 911 communicates with the other computing node 20 via the I/O bus adapter 914, the interconnect adapter 913, and the interconnect router 918.

Furthermore, the network adapter 915 is connected to an internal network in the information processing system 1. The CPU 911 sends and receives data to and from the network connected to the network adapter 915.

The disk adapter 516 is connected to the disk 917. The disk 917 is a storage device, such as a hard disk or the like. The CPU 911 reads and writes data from and in the disk 917 via the I/O bus adapter 914 and the disk adapter 916.

The CPU 911 and the memory 912 implement functions, such as execution of a job or the like.

According to an aspect of an embodiment of the information processing system, the management device control program, and the control method of the information processing system disclosed in the present invention, an advantage is provided in that the use efficiency of a node can be improved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
a plurality of information processing apparatuses; and
a management device that manages placement of a job that is processed by one of the information processing apparatuses to the one of the information processing apparatuses, wherein the management device includes
an information acquiring unit that acquires information related to each of a plurality of jobs that are submitted in a predetermined time period,
a weight calculating unit that calculates the degree of influence due to a frequency of appearance or an occupied time period for each of shapes of the jobs, by multiplying a product of a percentage of a number of the jobs and a predetermined coefficient by an occupancy of an execution time period of each of shapes of the jobs, the predetermined coefficient being statistically calculated on the basis of a result obtained by submitting a specific job to the information processing system and executing the specific job, and the weight calculating unit calculates the frequency of submission for each of shapes of the jobs in the predetermined time period,
a shape determining unit that determines, as pre-placement target shapes, shapes of a predetermined number of jobs in the order the degree of influence is high,
a pre placement table computing unit that determines, on the basis of the pre-placement target shapes and the degree of influence, pre placement of the jobs that is a way of placing the jobs to one of the information processing apparatuses, and
a job placement unit that allocates a job, when the shape of a submitted job matches one of the pre-placement target shapes, the submitted job to the one of the information processing apparatuses in accordance with the pre placement.

2. The information processing system according to claim 1, wherein
the information acquiring unit acquires, as information related to each of the jobs, an execution time period and a frequency of submission in a predetermined time period for each of shapes of the jobs, and
the weight calculating unit calculates the degree of influence for each shape of each of the jobs as calculation weights on the basis of the execution time period.

3. The information processing system according to claim 2, wherein the weight calculating unit makes the degree of influence of a specific job in the jobs high as the execution time period of the specific job is longer and makes the degree of influence of the specific job high as the frequency of submission of the specific job increases.

4. The information processing system according to claim 1, wherein the pre placement table computing unit obtains, on the basis of the degree of influence, a number of jobs having the pre-placement target shapes that are simultaneously placed and determines a job placement that includes the obtained pre-placement target shapes in accordance with the obtained number of jobs.

5. The information processing system according to claim 1, wherein, when the submitted job is not targeted for the pre-placement having a shape other than the pre-placement target shapes or when another job is allocated to one of the information processing apparatuses that is associated with a placement position of one of the pre-placement target shapes that matches the pre-placement target shape of the submitted job and that matches the shape of the submitted job obtained when the pre placement is performed, the job placement unit places the submitted job in an area that is other than an area in which the job that has the pre-placement target shape is placed and that has a shape in which the submitted job is included.

6. The information processing system according to claim 1, wherein, when the submitted job is not targeted for the pre-placement having a shape other than the pre-placement target shapes or when another job is allocated to one of the information processing apparatuses that is associated with a placement position of one of the pre-placement target shapes that matches the pre-placement target shape of the submitted job and that matches the shape of the submitted job obtained when the pre placement is performed, and when another job is not yet allocated to one of the information processing apparatuses that is associated with a pre-placed unused area that is an area in which a job that has the pre-placement target shape is allocated and that has a shape in which the submitted job is included, the job placement unit allocates the submitted job the information processing apparatus that is associated with the pre-placed unused area.

7. The information processing system according to claim 5, wherein when the submitted job is not able to be included in the pre-placed unused area, the job placement unit creates a connection area that has a shape in which the submitted job is included by connecting multiple of the pre-placed unused areas and allocates the submitted job to one of the information processing apparatuses that is associated with the connection area.

8. The information processing system according to claim 1, wherein the pre placement table computing unit acquires, at predetermined intervals, the pre-placement target shapes and the degree of influence and, when a tendency of a job appearance is changed from previously determined job placement, the pre placement table computing unit recalculates the pre placement.

9. A computer-readable recording medium having stored therein a management device control program causing a computer to execute a process comprising:
acquiring information related to each of a plurality of jobs that is submitted in a predetermined time period;
calculating the degree of influence due to a frequency of appearance or an occupied time period for each shapes of the jobs, by multiplying a product of a percentage of a number of the jobs and a predetermined coefficient by an occupancy of an execution time period of each of shapes of the jobs, the predetermined coefficient being statistically calculated on the basis of a result obtained by submitting a specific job to the information processing system and executing the specific job and calculating the frequency of submission for each of shapes of the jobs in the predetermined time period;
specifying, as pre-placement target shapes, shapes of a predetermined number of jobs in the order the degree of influence is high;
determining, on the basis of the pre-placement target shapes and the degree of influence, pre placement of the jobs that is a way of allocating the jobs to one of multiple information processing apparatuses; and
placing, when a submitted job matches one of the pre-placement target shapes, the submitted job to the one of the information processing apparatuses in accordance with the pre placement.

10. A control method of an information processing system that includes a plurality of information processing apparatuses and a management device that manages placement of a job that is processed by one of the information processing apparatuses to the one of the information processing apparatuses, the control method comprising:

acquiring, performed by the management device, information related to each of a plurality of jobs that is submitted in a predetermined time period;

calculating, performed by the management device, the degree of influence due to a frequency of appearance or an occupied time period for each shapes of the jobs, by multiplying a product of a percentage of a number of the jobs and a predetermined coefficient by an occupancy of an execution time period of each of shapes of the jobs, the predetermined coefficient being statistically calculated on the basis of a result obtained by submitting a specific job to the information processing system and executing the specific job and calculating the frequency of submission for each of shapes of the jobs in the predetermined time period;

specifying, performed by the management device, as pre-placement target shapes, shapes of a predetermined number of jobs in the order the degree of influence is high;

determining, performed by the management device, on the basis of the pre-placement target shapes and the degree of influence, pre placement of the jobs that is a way of allocating the jobs to one of multiple information processing apparatuses; and allocating, performed by the management device, when a submitted job matches one of the pre-placement target shapes, the submitted job to the one of the information processing apparatuses in accordance with the pre placement.

* * * * *